United States Patent
Sluijs

(12) 
(10) Patent No.: US 6,437,545 B2
(45) Date of Patent: Aug. 20, 2002

(54) DC/DC CONVERTER INCLUDING CONTROL MEANS FOR CONTROLLING MULTIPLE OUTPUTS USING SEPARATE SWITCHING CYCLES FOR EACH OUTPUT

(75) Inventor: Ferdinand Jacob Sluijs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/899,441

(22) Filed: Jul. 5, 2001

(30) Foreign Application Priority Data

Jul. 6, 2000 (EP) .............................................. 00202359

(51) Int. Cl.$^7$ ................................................ G05F 1/10
(52) U.S. Cl. ...................................... 323/222; 323/267
(58) Field of Search ................................. 323/222, 283, 323/284, 285, 225, 265, 267, 234

(56) References Cited

U.S. PATENT DOCUMENTS 5,568,044 A   10/1996   Bittner ........................ 323/272
6,057,675 A  *  5/2000   Tateishi ....................... 323/283
6,157,182 A  * 12/2000   Tanaka et al. ............... 323/284

* cited by examiner

*Primary Examiner*—Adolf Deneke Berhane
(74) *Attorney, Agent, or Firm*—Aaron Waxler

(57) ABSTRACT

A DC/DC converter (10; 30; 40; 50; 60), comprising inductive energy storage means (2), switching means (S0–S7) and control means (9; 31; 41; 51; 61), wherein said control means (9; 31; 41; 51; 61) are arranged for selectively operating said switching means (S0–S7) for providing electrical energy from said energy storage means (2) to an output (A; B; C; D) of said DC/DC converter (10; 30; 40; 50; 60) in both a Pulse Width Modulation (PWM) mode and a Pulse Frequency Modulation (PFM) mode switching cycle. The control means (9; 31; 41; 51; 61) are arranged for controlling multiple outputs (A; B; C; D) of said DC/DC convertor (10; 30; 40; 50; 60) by providing a sequence (T) of a number of separate switching cycles for each output (A; B; C; D), and for establishing a main output among said multiple outputs (A; B; C; D) requiring the highest amount of energy, wherein said main output in PWM mode determines the total amount of energy to be supplied in a sequence (T) and the number of switching cycles of an output in PWM mode is determined by part of the total amount of energy to be supplied at said output.

10 Claims, 4 Drawing Sheets

DC/DC CONVERTER INCLUDING CONTROL MEANS FOR CONTROLLING MULTIPLE OUTPUTS USING SEPARATE SWITCHING CYCLES FOR EACH OUTPUT

FIELD OF THE INVENTION

The invention relates to a DC/DC converter, comprising inductive energy storage means, switching means and control means, wherein the control means are arranged for selectively operating the switching means for providing electrical energy from the energy storage means to an output of the DC/DC converter in both a Pulse Width Modulation (PWM) mode and a Pulse Frequency Modulation (PFM) mode switching cycle.

A DC/DC converter of this type is know from U.S. Pat. 5,568,044.

Depending on the load at the output, the known converter selects a particular conversion mode. That is, at a relatively low output load the PFM or discontinuous mode is selected, whereas for a relatively high output load, up to its maximum, the converter operates in the PWM or continuous mode. This, in order to control the output voltage of the DC/DC converter with a high efficiency over a large output power range.

In a single-output DC/DC converter operated in PWM mode, the output power is controlled by its duty cycle, which is the ratio of the length of a first phase of the switching cycle wherein energy is stored in the energy storage means and the total length of the switching cycle. This is a linear relationship, such that an increase of the duty cycle results in an increase of the energy to be stored and, accordingly a higher output power to be delivered at the output. The duty cycle is determined by the ratio of the input voltage and the output voltage of the DC/DC converter.

In the PFM mode a constant output voltage is maintained by skipping switching cycles while the output voltage exceeds its nominal value.

In a multi-output DC/DC converter the output voltage of each of the outputs has to be controlled separately. In a PWM mode, for example, this results in different values for the duty cycle of each output, because the ratio of the input voltage and the output voltage differs for each output. However, the duty cycle is also related to the amount of energy to be stored and the total energy to be provided at the output of the converter. Due to the different output voltages this relation is not linear. Accordingly, the control principles for a single-output DC/DC converter cannot be used for multi-output DC/DC converters.

It is an object of the present invention to propose a DC/DC converter, providing a correct distribution of the stored energy to the different outputs, either in a PWM mode or a PFM mode dependent on the output power required by the load at a particular output.

This object is solved by the present invention in a DC/DC converter of the type mentioned above, in that the control means are arranged for controlling multiple outputs of the DC/DC converter by providing a sequence of a number of separate switching cycles for each output, and for establishing a main output among the multiple outputs requiring the highest amount of energy, wherein the main output in PWM mode determines the total amount of energy to be supplied in a sequence, and the number of switching cycles of an output in PWM mode is determined by part of the total amount of energy to be supplied at this output.

In accordance with the present invention, with each output of the multi-output DC/DC converter a number of switching cycles in a sequence of switching cycles is associated. The total amount of energy to be supplied in a sequence is, in accordance with the invention, determined by a so-called main output in PWM mode, which is the output of the converter requiring the highest amount of energy. Then, the number of switching cycles of any other of the outputs in PWM mode is determined from which part of the total amount of energy has to be supplied to a particular output.

In order to determine which of the outputs is active during a sequence, in a further embodiment of the invention, the control means are arranged for determining of each output a so-called ratio, being the number of switching cycles for an output in a sequence divided by the total number of switching cycles of the sequence, such that an active output is selected based on the ratio and output voltage of this output.

In PFM mode, a new switching cycle is started if the output voltage drops below a reference voltage and if the ratio determines whether the output is to be switched in the sequence.

Accordingly, if the output voltage for an output in PFM mode has not dropped below a reference voltage, no new switching cycle will be started in the particular sequence. In such a case, in the sequence, the output can be replaced by one of the other outputs in PWM mode, for example.

In the case of a main output in PWM mode, in a further embodiment of the DC/DC converter according to the invention, the control means are arranged such that the output voltage of the main output controls the ratio of the main output and the total energy provided in a sequence, and in that for an other output in PWM mode the output voltage thereof controls the ratio of this output and part of the total energy to be provided at this output in a sequence.

Thus, for an output in PWM mode the ratio of an output determines when a new switching cycle is started for this output. When all outputs are in PWM mode the ratio of an output is equal to the number of switching cycles of the output in the sequence. If several outputs operate in a PWM mode, the main output is the output having the highest ratio.

In a practical embodiment of the DC/DC converter according to the invention, each output comprises separate control means, having a duty cycle output, a ratio output and a mode output, timer means connected to the duty cycle output of the control means for controlling the switching means, means for establishing a main output and an active output, which means being connected to the ratio and the mode output of each of the control means and having an active output connected to the timer means and to an input each of the control means and a main output connected to a further input of the control means, and comparator means for comparing of each output its output voltage with a reference voltage, an output of the comparator means connect to an input of an associated control means.

In this embodiment of the DC/DC converter according to the invention, the output voltages of the several outputs are compared with reference voltages, wherein the result of the comparison is used to determine the next action for the momentary active output. Each output has its own controller for determining its mode (PWM of PFM), duty cycle and ratio. The main output and the active output are determined by the duty cycle and ratio of all outputs. The timer means drive the switches according to the active output, mode and duty cycle of a particular output, i.e. control means.

The invention may be practised with a plurality of DC/DC converter designs, such as multi-output DC/DC up converters, multi-output DC/DC down converters, multi-output DC/DC up/down converters, multi-output DC/DC inverting converters, multi-output DC/DC converters with positive and negative output and multi-output DC/DC up/down converters with multiple positive and negative outputs, for example.

The invention also relates to a power supply comprising a DC/DC converter disclosed above, and arranged for receiving an input voltage at input terminals and for providing controlled output voltages at multiple output terminals.

The DC/DC converter according to the invention is of particular advantage if applied in an electronic appliance, such as, but not limited to, a portable electronic appliance.

The invention will now be described in more detail with reference to the accompanying drawings, wherein like reference numerals designate parts having the same or like function:

FIG. 1 shows a basic circuit of a prior art DC/DC up-converter 1 having a single output.

Figure 1:
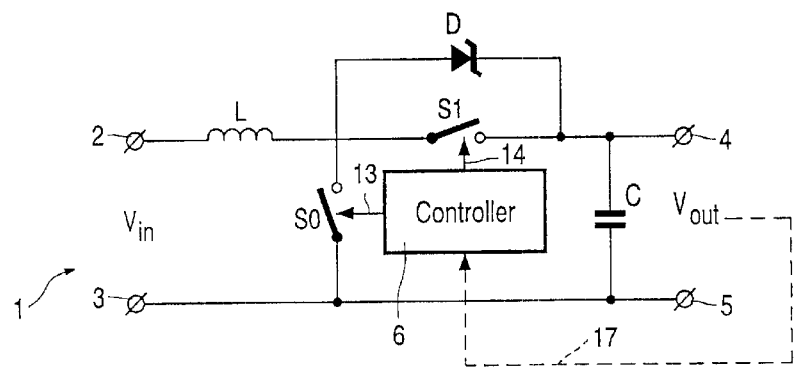
FIG. 1 shows a circuit diagram of a prior art single output DC/DC converter.

The converter 1 comprises inductive energy storage means taking the form of a coil L. The coil L and switching means S1 are series connected between a first input terminal 2 and a first output terminal 4. The connection of the coil L and the switching means S1 connects via switching means S0 to a second input terminal 3 and a second output terminal 5. A diode D is parallel connected with the switching means S1 and provides a current conductive path from the first input terminal 2 to the first output terminal 4. A smoothing capacitor C is parallel connected with the first and second output terminals 4, 5. The second input terminal 3 and the second output terminal 5 connect through a common conductive part, for example the earth or mass of an electronic appliance.

The converter 1 is operated to provide a controlled or regulated output voltage Vout at the output terminals 4, 5 in response to an input voltage Vin at the input terminals 2, 3. To this end, a controller or control means 6 are provided for operating the switching means S0 and S1 in accordance with a Pulse Frequency Modulation (PFM) and a Pulse Width Modulation (PWM) control scheme, wherein the output voltage Vout is higher than the input voltage Vin. The control of the switching S0 and S1 is schematically indicated by arrows 13, 14. Measurement of the output voltage Vout by the control means 6 is schematically indicated by dashed arrow 17.

Figure 2A:
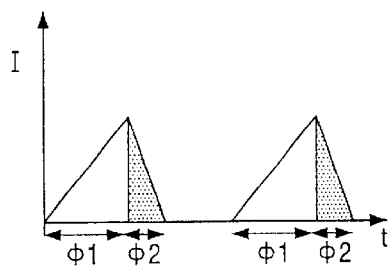
FIGS. 2a and 2b show, in a graphic representation, current flow in the inductive energy storage means for a PFM and PWM mode, respectively, in the DC/DC converter shown in FIG. 1.

FIG. 2a shows the coil current I against the time t in a typical switching cycle in PFM mode or discontinuous mode, wherein the current I through the coil L becomes zero. In a first phase Φ1, the switching means S0 are closed, that is in a current conductive state, and the switching means S1 are open, that is in a none-current conductive state. During the first phase Φ1 current flows only through the coil L storing electrical energy therein.

During phase Φ2 the switching means S0 are open and the switching means S1 are closed. In this phase, energy build up in the coil L is provided at the output terminals 4, 5 resulting in an output voltage Vout which is higher than the input voltage Vin. A new switching cycle is started once the measured output voltage Vout (indicated by a dashed line) drops below a set reference voltage Vref, controlled by the control means 6.

Figure 2B:
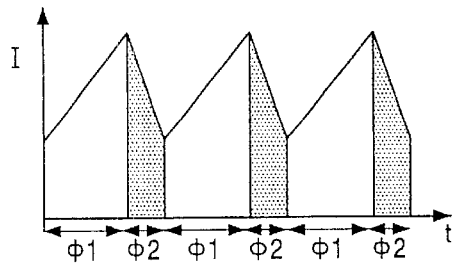

In PWM or continuous mode, shown in FIG. 2b, the coil current I does not become zero. Likewise, during the first phase Φ1 energy is stored or build up in the coil L, whereas in the second phase Φ2 of the PWM switching cycle the stored energy is delivered to the output terminals 4, 5 of the converter 1. Whenever the output voltage Vout drops below the reference voltage Vref a new switching cycle is started.

The PFM mode is used for providing a relatively low output power at the output terminals 4, 5 of the converter 1 and the PWM mode is used for providing a relatively high output power up to the maximum output power of the converter 1. The combination of PFM and PWM mode results in an overall high efficiency.

In PWM mode, the duty cycle is defined as the ratio of the length of the first phase Φ1 and the total length of a switching cycle, that is Φ1+Φ2. In the single-output DC/DC converter 1, the output power and the duty cycle have a linear relationship, in that an increase of the duty cycle results in an increase of the energy to be stored in the coil L. The duty cycle is determined by the ratio of the input voltage and the output voltage of the DC/DC converter 1.

Figure 3:
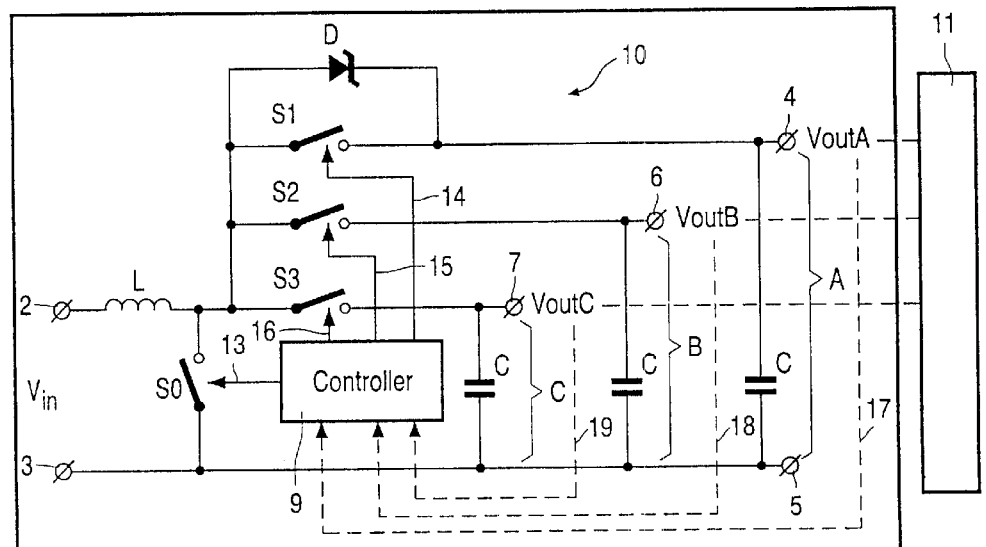
FIG. 3 shows a circuit diagram of a multi-output DC/DC up-converter comprising control means in accordance with the present invention.

FIG. 3 shows a multi-output DC/DC up-converter 10 having three outputs A, B and C. That is, output A having output terminals 4, 5, output B having output terminals 6, 5 and output C having output terminals 7, 5. Control means 9 are arranged for operating 13, 14, 15, 16 switching means S0, S1, S2 and S3 for controlling 17, 18, 19 the output power at output A, output B and output C, respectively.

For an efficient operation of the multi-output DC/DC up-converter 10 over a large output power range, it is necessary that each of the outputs A, B, C can be independently controlled in either the PFM and the PWM mode.

In PWM mode, the duty cycles of the outputs may differ because for each output the ratio between the input voltage and output voltage may be different. However, the duty cycle is also related to the current I in the coil L of the converter 10 and the total output power provided. Because of the different output voltages, contrary to the single-output DC/DC converter 1, the relationship between the duty cycle of an output and the coil current in the multi-output DC/DC converter 10 is not linear. Accordingly, the control principles for the single-output DC/DC converter 1 of FIG. 1 cannot be used for the multi-output DC/DC converter 10 of FIG. 3, for example.

In accordance with the invention, a new approach for controlling the duty cycle and the coil current in PWM mode of a multi-output DC/DC converter is proposed, which includes a correct distribution of the total energy stored in the coil L among the different outputs.

Figure 4:
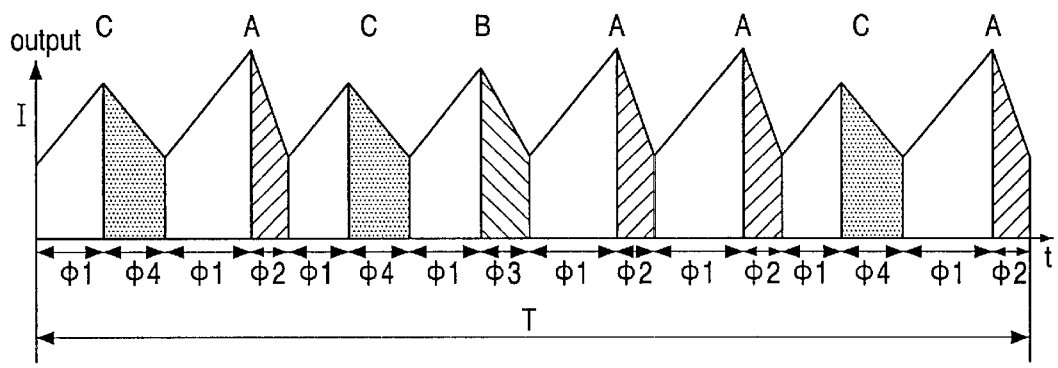
FIG. 4 shows, in a graphic representation, current flow in the inductive energy storage means in the DC/DC converter shown in FIG. 3.

FIG. 4 shows the coil current I in a sequence of different switching cycles in accordance with the present invention, for the multi-output DC/DC converter shown in FIG. 3.

The several phases Φ1, Φ2, Φ3, Φ4 shown corresponds with the following state of the switching means:

Φ1: switch S0 is closed and switches S1, S2 and S3 are open; the coil current I increases. Φ2: switch SI is closed and switches S0, S2 and S3 are open; energy from the coil L is transferred to output A. Φ3: switch S2 is closed and switches S0, S1 and S3 are open; energy is transferred from the coil L to output B.

Φ4: switch S3 is closed and switches S0, S1 and S2 are open; energy is transferred from the coil L to output C.

For the control of the multi-output DC/DC converter in accordance with the invention, the following definitions are introduced:

The duty cycle for an output X is defined as:

$$duty\ cycle\ X = t1/T$$

wherein:
t1=length of first phase Φ1 of the switching cycle for output X
T=length of the total switching sequence
A ratio is introduced and defined for each output X being:

$$ratio\ X = NX/NT$$

wherein:
NX=number of switching cycles for output X in the sequence
NT=total number of switching cycles in a sequence X=A, B, C
With the sum of the ratios:

$$ratio\ A + ratio\ B + \ldots = 1$$

A main output is defined as the output requiring the highest output power.

Both the duty cycle and the ratio are the control parameters of the converter in accordance with the invention.

Following the above definitions, the control principles for a multi-output DC/DC-converter in PWM mode in accordance with the invention are:

1. All outputs A, B, C, . . . may operate in PFM and PWM mode.
2. In PFM and in PWM mode for each output the length of the phases of a switching cycle is determined by the duty cycle of the particular output.
3. The values of the ratio determine the sequence in which the outputs in PWM mode receive output power.
4. For the main output in PWM mode, the output voltage controls the duty cycle of this output and, accordingly, the total output power of the converter.
5. For the other outputs in PWM mode, not being the main output, the output voltage controls the ratio of this output and, accordingly part of the total output power received by the particular output.
6. For an output in PWM mode, the ratio of an output determines when a new switching cycle is started for this output. If all outputs are in PWM mode this ratio is equal to the number of switching cycles for the particular output in the sequence. If not all outputs are in PWM mode, the number of conversion cycles in the sequence is distributed over the PWM output according to a relative ratio which is the ratio of the output divided by the sum of the ratio of all outputs in PWM mode.
7. For an output in PFM mode an new conversion cycle is only started if the output voltage of this output drops below a reference voltage and the ration determines to have the particular output at that moment in the sequence.

In the example of FIG. 4, the multi-output DC/DC converter 10 is operating in PWM mode. Output A is the main output and is operating in PWM mode. Output B is operating in PFM mode and output C is operating in PWM mode. The total length of the sequence is 8 switching cycles, as shown in FIG. 4, such that the ratios are: ratio A=⁴⁄₈, ratio B=⅛ and ratio C=⅜.

If during the next sequence the output voltage of output B drops below its reference voltage, for example, the sequence will be repeated. If the output voltage of output B remains above the reference voltage, the switching cycle of output B will be skipped and replaced by a switching cycle of any of the other outputs A or C. This implies that the relative ratio A becomes ⁴⁄₇ and the relative ratio of C becomes ³⁄₇.

If the output power of output B increases, the output will be switched from PFM mode into PWM mode. If in such a case the total output power is not sufficient, the duty cycle of the main output, in the present example output A, will increase. If the output power of output B further increases, ratio B has to be increased and the other ratios have to be decreased. Again, if the total output power is not sufficient, the duty cycle of output A will increase.

If a further increase of the output power of output B results in that the ratio of output B will become higher than the ratio of output A, than output B will become the main output. In that case, the duty cycle of output B will be controlled by output B.

For the selection of the main output during operation, the following control principles will be applied:

8. If only one of the outputs is in PWM mode, this output will be the main output.
9. If several outputs operate in PWM mode, the output having the highest ratio will be the main output.
10. If one of the other outputs in PWM mode controls its ratio against a value which is higher than the other outputs, this output will become the main output.
11. If the main output switches back from PWM to PFM and the main was the only output in PWM, than this output remains the main output.
12. If the main output switches back from PWM to PFM and also other outputs operate in PWM, than the PWM output having the highest ratio becomes the new main output.
13. The outputs in PFM mode receive energy when the output voltage of a particular output drops below its reference level. However, the maximum energy received is determined by its ratio. If this is not sufficient, the output will have to switch over into the PWM mode.
14. Output voltage measurement is provided each switching cycle for outputs in PFM mode. The output voltage of an output operating in PWM mode is only measured if this output receives output power in a particular sequence. The output voltage of an output in PWM mode is only measured if this output receives output power during its switching cycle in a sequence. Other PWM outputs are blanked to prevent errors in output voltage measurement.

Figure 5:
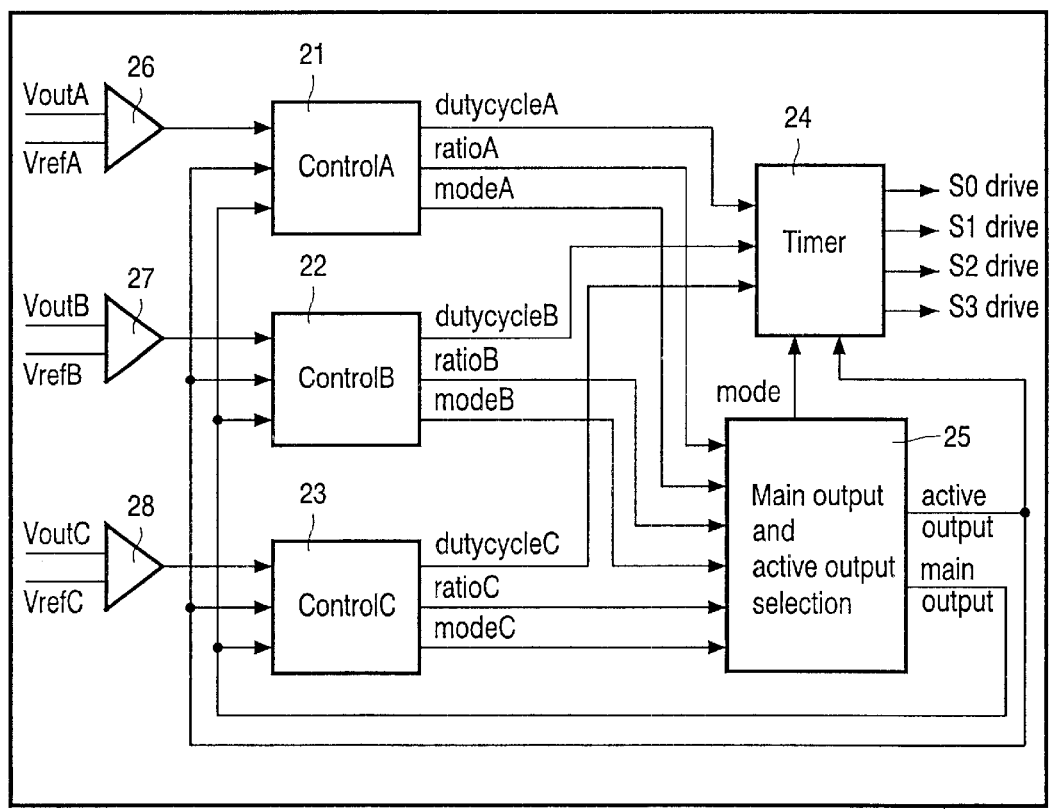
FIG. 5 shows a block diagram of an embodiment of controller means according to the present invention.

FIG. 5 shows, in a block diagram, an embodiment of the control means 9 of the DC/DC converter 10 shown in FIG. 3 in accordance with the present invention.

Each output A, B, C comprises a separate control part 21, 22, 23, respectively. The control parts 21, 22, 23 each provide an output signal representing the duty cycle, the ratio and the mode of a particular output A, B, C, respectively. In FIG. 5 this is indicated as duty cycle A, ratio A and mode A for output A; duty cycle B, ratio B and mode B for output B and duty cycle C, ratio C and mode C for output C.

The control means 9 further comprise timer means 24 for driving the switching means S0, S1, S2 and S3 of the converter 10. The timer means 24 receive the respective duty cycle output signals of the control parts 21, 22, 23.

Further, means 25 are provided for establishing the main output and selecting an active output, that is an output of the DC/DC controller currently receiving energy from the energy storage means, that is coil L.

The ratio and mode output signals of each of the control parts 21, 22 and 23 are provided as input signals to the means 25, which provide an output signal representing the mode of a particular output, the currently active output and the main output. The mode output signal and the active output signal are fed to the timer means 24, and the signal indicating the main output is provided as an input signal to the separate control parts 21, 22 and 23. The output signal of the means 25 indicating the currently active output is also fed as an input signal to each of the control parts 21, 22, 23.

Comparator means 26, 27, 28 are provided for comparing the output voltage Vout of a particular output against a reference voltage Vref set for this output. That is, comparator means 26 compare VoutA against VrefA, comparator means 27 compare VoutB against VrefB, and comparator means 28 compare VoutC against VrefC. The output of the comparator means 26, 27, 28 is provided as an input signal to the control parts 21, 22, 23, respectively.

Accordingly, each output A, B, C has its own control part 21, 22, 23 to determine the mode, duty cycle and ratio of the particular output. In order to calculate the duty cycle of a particular output from its output voltage, information concerning the main output as well as the active output is required, which information is provided from the means 25 arranged for selecting the main output and the active output, following the control principles outlined above. That is, the main output is the output receiving the highest output power and the active output determines which output receives power during the current switching sequence. The timer means 24 drive the switching means S0, S1, S2, S3 in accordance with the active output, mode and duty cycle of each particular output A, B, C.

The control principle according to the invention is not limited to multi-output DC/DC up-converters of the type shown in FIG. 3.

Several other DC/DC converters having a plurality of outputs can be controlled in accordance with the invention, either arranged as up-converter or down-converter or both.

Figure 6:
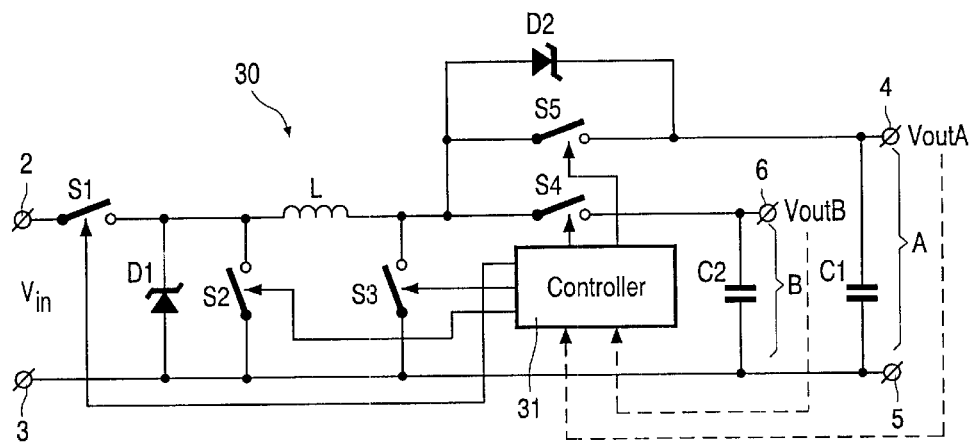
FIGS. 6, 7, 8 and 9 show, in a circuit diagram representation, embodiments of multi-output DC/DC converters comprising control means in accordance with the present invention.

FIG. 6 shows a circuit diagram of a multi-output DC/DC up/down-converter 30 having two outputs A, B and control means 31 arranged for operating the converter 30 in accordance with the control principles of the present invention, as outlined above. The converter shown is a combination of a so-called boost and buck converter. In the boost (up) mode, the switching means S1 are closed and the switching means S2 are open. The switching means S3 and either S4 or S5, depending on which of the outputs receives output power, are operated for up-converting the input voltage Vin applied at the input terminals.

In the buck mode, switching means S3 are open and either one of the switching means S4 or S5 is closed, such that with the switching means S1 and S2 the input voltage can be down-converted to an output voltage lower than the input voltage. A converter of this type is known from the international patent application WO 95/34121 of applicant.

Figure 7:
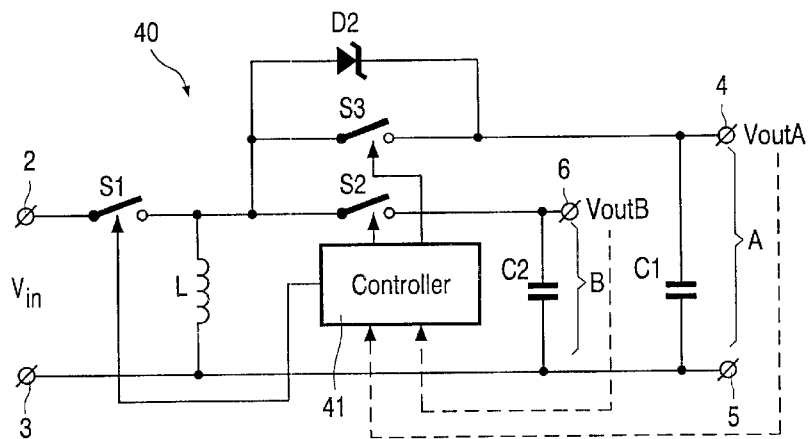

FIG. 7 is a circuit diagram of a multi-output DC/DC inverting converter 40 having two outputs A, B, providing a negative output voltage compared to the input voltage Vin and having control means 41.

Figure 8:
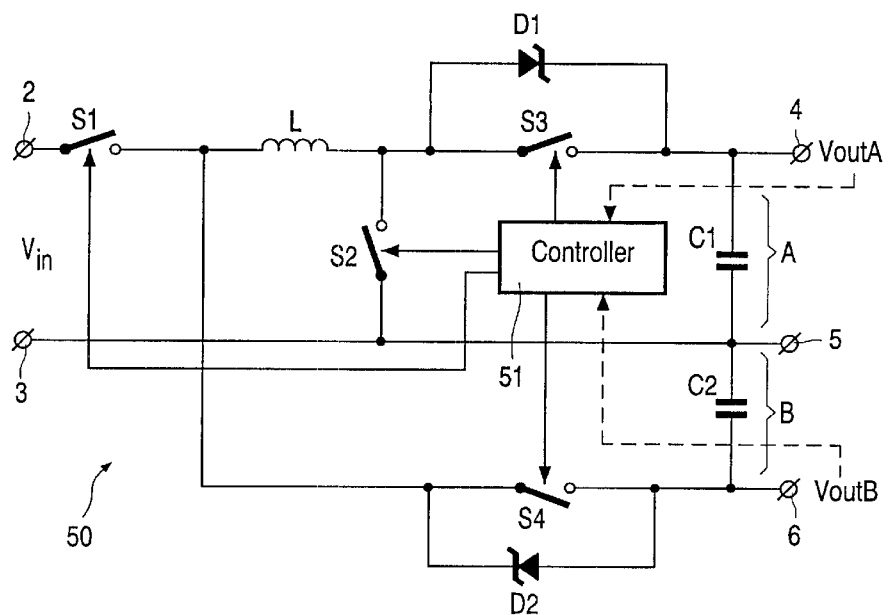

FIG. 8 shows a circuit diagram of a multi-output DC/DC converter 50 having a positive output A and a negative output B and control means 51.

Figure 9:
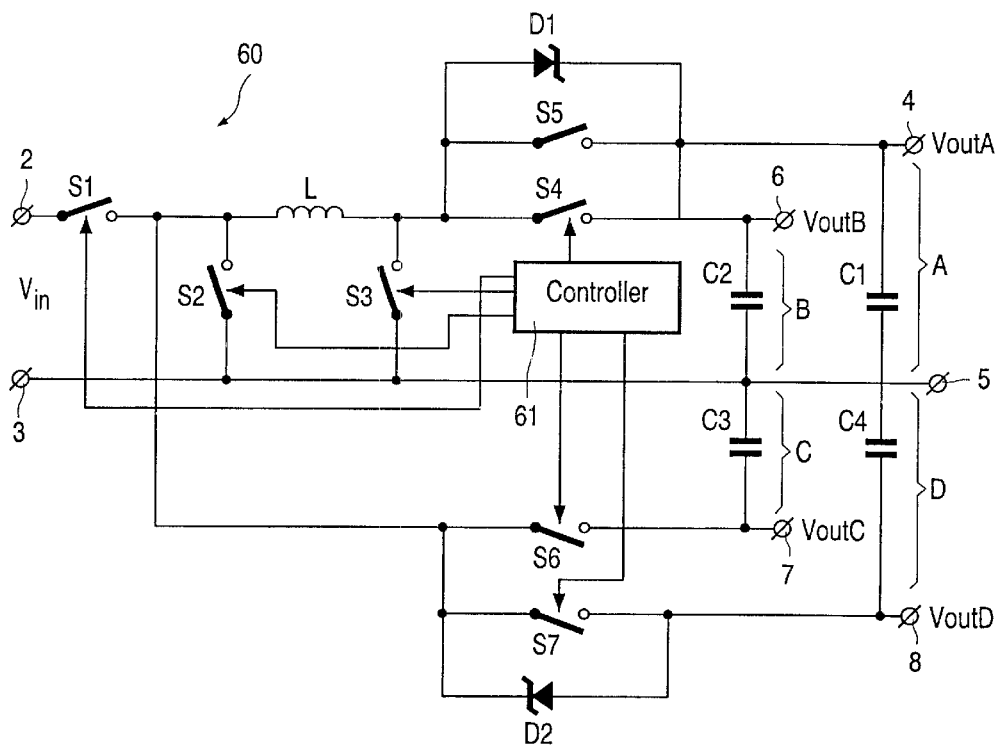

FIG. 9 shows a circuit diagram of a multi-output DC/DC up/down-converter 60 having two positive outputs A and B and two negative outputs C and D at output terminals 4, 6, 7, 8, respectively, and control means 61.

For all of the circuit diagrams shown in FIGS. 7, 8 and 9, the control means 41, 51 and 61 are arranged for operating in accordance with the present invention.

Those skilled in the art will appreciate that in the DC/DC converter 10, for example, the switching means S1 can be omitted and replaced by the diode D. However, to increase the power conversion efficiency of the DC/DC converter 10, use of separate switching means are preferred to avoid a relatively large voltage drop across the respective diodes.

The DC/DC converter operating in accordance with the principles of the present invention, may be used with or in an electronic appliance 11, such as a portable electronic appliance, or arranged to form a separate power supply, schematically indicated by block 12 in FIG. 3.

I claim:

1. A DC/DC converter (10; 30; 40; 50; 60), comprising inductive energy storage means, switching means (S0–S7) and control means (9; 31; 41; 51; 61), wherein said control means (9; 31; 41; 51; 61) are arranged for selectively operating said switching means (S0–S7) for providing electrical energy from said energy storage means to an output (A; B; C; D) of said DC/DC converter (10; 30; 40; 50; 60) in both a Pulse Width Modulation (PWM) mode and a Pulse Frequency Modulation (PFM) mode switching cycle, characterised in that said control means (9; 31; 41; 51; 61) are arranged for controlling multiple outputs (A; B; C; D) of said DC/DC convertor (10; 30; 40; 50; 60) by providing a sequence (T) of a number of separate switching cycles for each output (A; B; C; D), and for establishing a main output among said multiple outputs (A; B; C; D) requiring the highest amount of energy, wherein said main output in PWM mode determines the total amount of energy to be supplied in a sequence (T) and the number of switching cycles of an output in PWM mode is determined by part of the total amount of energy to be supplied at said output.

2. A DC/DC converter (10; 30; 40; 50; 60) according to claim 1, wherein said control means (9; 31; 41; 51; 61) are arranged for determining of each output (A; B; C; D) a ratio being the number of switching cycles for said output (A; B; C; D) in said sequence (T) divided by the total number of switching cycles of said sequence (T), such that an active output (A; B; C; D) is selected based on said ratio and output voltage (Vout) of said output (A; B; C; D).

3. A DC/DC converter (10; 30; 40; 50; 60) according to claim 2, wherein for an output (A; B; C; D) in PFM mode a new switching cycle is started if said output (A; B; C; D) voltage (Vout) drops below a reference voltage (Vref) and said ratio determines whether said output (A; B; C; D) is to be switched in said sequence (T).

4. A DC/DC converter (10; 30; 40; 50; 60) according to claim 2, wherein said control means (9; 31; 41; 51; 61) are arranged such that for the main output in PWM mode its output voltage (Vout) controls the ratio of this output and the total energy provided in a sequence (T), and in that for an other output in PWM mode its output voltage (Vout) controls the ratio of this output and part of the total energy to be provided at said output in a sequence (T).

5. A DC/DC converter (10; 30; 40; 50; 60) according to claim 2, wherein if several outputs are in a PWM mode, the main output is the output having the highest ratio.

6. A DC/DC converter (10; 30; 40; 50; 60) according to claim 5, wherein said control means (9; 31; 41; 51; 61) are arranged such that if all outputs (A; B; C; D) are in a PWM mode the ratio of an output (A; B; C; D) is equal to the number of switching cycles of said output in said sequence (T).

7. A DC/DC converter (10; 30; 40; 50; 60) according to claim 1, wherein said control means (9; 31; 41; 51; 61) for each output (A; B; C; D) comprise a separate control part (21; 22; 23), having a duty cycle output, a ratio output and a mode output, timer means (24) connected to said duty cycle output of said control parts (21; 22; 23) for controlling said switching means (S0–S7), means (25) for establishing a main output and an active output, said means (25) being connected to said ratio and said mode output of each of said control parts (21; 22; 23) and having an active output connected to said timer means (24) and to an input each of said control parts (21; 22; 23) and a main output connected to a further input of said control parts (21; 22; 23), and comparator means (26; 27; 28) for comparing of each output (A; B; C; D) its output voltage (Vout) with a reference voltage (Vref), an output of said comparator means (26; 27; 28) connect to an input of an associated control part (21; 22; 23).

8. A DC/DC converter (10; 30; 40; 50; 60) according to claim 1, said DC/DC converter (10; 30; 40; 50; 60) comprising at least one of a group including multi-output DC/DC up converters, multi-output DC/DC down converters, multi-output DC/DC up/down-converters, multi-output DC/DC inverting converters, multi-output DC/DC converters with positive and negative output, and multi-output DC/DC up/down-converters with multiple positive and negative outputs.

9. A power supply (12) comprising a DC/DC converter (10; 30; 40; 50; 60) according to claim 1, arranged for receiving an input voltage (Vin) at input terminals (2, 3) and for providing controlled output voltages (Vout) at multiple output terminals (4–8) of said DC/DC converter (10; 30; 40; 50; 60).

10. An electronic appliance (11) comprising a DC/DC converter (10; 30; 40; 50; 60) according to claim 1.

* * * * *